United States Patent
Bourgeois

(10) Patent No.: US 7,188,478 B2
(45) Date of Patent: Mar. 13, 2007

(54) POWER GENERATION SYSTEM AND METHOD OF OPERATING SAME

(75) Inventor: Richard Scott Bourgeois, Albany, NY (US)

(73) Assignee: General Electric Company, Niskayuna, NY (US)

( * ) Notice: Subject to any disclaimer, the term of this patent is extended or adjusted under 35 U.S.C. 154(b) by 145 days.

(21) Appl. No.: 10/939,707

(22) Filed: Sep. 13, 2004

(65) Prior Publication Data

US 2006/0053792 A1    Mar. 16, 2006

(51) Int. Cl.
*F02C 1/00*    (2006.01)

(52) U.S. Cl. ..................... 60/772; 60/39.511

(58) Field of Classification Search ............. 60/39.181, 60/39.182, 39.183, 39.5, 39.511, 772
See application file for complete search history.

(56) References Cited

U.S. PATENT DOCUMENTS

| | | | | |
|---|---|---|---|---|
| 3,070,703 A * | 12/1962 | Podolny | ........................ | 290/2 |
| 4,087,976 A * | 5/1978 | Morrow et al. | ............... | 60/643 |
| 4,161,657 A * | 7/1979 | Shaffer, Jr. | .................. | 290/1 R |
| 4,216,067 A * | 8/1980 | Mitchell | ...................... | 205/628 |
| 4,841,731 A * | 6/1989 | Tindell | ....................... | 60/641.8 |
| 4,896,507 A * | 1/1990 | Hosford | ...................... | 60/641.8 |
| 4,910,963 A * | 3/1990 | Vanzo | ......................... | 60/641.8 |
| 4,942,733 A * | 7/1990 | Hosford | ...................... | 60/267 |
| 5,177,952 A * | 1/1993 | Stone | ........................ | 60/775 |
| 5,228,529 A * | 7/1993 | Rosner | ....................... | 180/65.3 |
| 5,806,316 A * | 9/1998 | Avakov et al. | ............... | 60/649 |
| 5,924,287 A * | 7/1999 | Best | .............................. | 60/643 |
| 5,948,221 A | 9/1999 | Hsu | ........................... | 204/270 |
| 6,024,859 A | 2/2000 | Hsu | ........................... | 205/343 |
| 6,093,306 A | 7/2000 | Hanrahan et al. | ........... | 205/619 |
| 6,446,597 B1 | 9/2002 | McAlister | .................... | 123/297 |
| 2003/0180584 A1 | 9/2003 | Suzuki et al. | ................... | 429/9 |
| 2005/0198958 A1* | 9/2005 | Haase | ........................ | 60/641.8 |
| 2005/0279094 A1* | 12/2005 | Yoshino | ...................... | 60/641.8 |
| 2006/0010867 A1* | 1/2006 | Shaw | ........................ | 60/641.8 |
| 2006/0065545 A1* | 3/2006 | Balan et al. | ................. | 205/628 |

\* cited by examiner

*Primary Examiner*—William H. Rodriguez
(74) *Attorney, Agent, or Firm*—Fletcher Yoder

(57) ABSTRACT

A power generation system comprising a liquid-cooled electrolyzer operable to produce a supply of hydrogen from water is provided. The power generation system may also comprise a steam turbine and a steam production device operable to produce a supply of steam to the steam turbine. The power generation system may also comprise a system operable to provide cooling liquid to the liquid-cooled electrolyzer and to couple heated cooling liquid from the liquid-cooled electrolyzer to the steam production device.

51 Claims, 5 Drawing Sheets

POWER GENERATION SYSTEM AND METHOD OF OPERATING SAME

BACKGROUND

The invention relates generally to the field of power generation systems and, more particularly, to a combined cycle power generation system for production of hydrogen.

Businesses and consumers consume large amounts of electricity. Some businesses produce electricity for sale or for their own use. Other businesses and consumers purchase electricity from a utility. The amount of electricity that is consumed may vary over the course of a day and over the course of a year. For example, overall electrical demand typically peaks in the late afternoon in the summer due to the high demand for power to run air conditioning systems. Electrical demand typically is lower in the winter and the late evening or early morning when temperatures are cooler and/or people are asleep. However, a power provider, such as a utility, must be able to provide sufficient power generating capacity to meet the peak demand. As a result, a typical power provider, such as an electrical utility, has excess power generating capacity during non-peak operating periods, such as the late evening or early morning.

Therefore, it would be desirable to have a technique to enhance the productivity and/or efficiency of a power generation system by utilizing the power generating capacity of the system during non-peak demand periods.

BRIEF DESCRIPTION

Briefly, in accordance with one aspect of the present invention, a power generation system is provided. The power generation system comprises a steam turbine, a steam production device operable to produce a supply of steam to the steam turbine and a liquid-cooled electrolyzer operable to produce a supply of hydrogen from water. The power generation system also comprises a cooling system operable to provide cooling liquid to the liquid-cooled electrolyzer and to couple heated cooling liquid from the liquid-cooled electrolyzer to the steam production device to enable the steam production device to produce steam from the heated cooling liquid.

In accordance with another aspect of the present invention, a method of operating a power generation system is provided. The method comprises producing a supply of hydrogen from water via a liquid-cooled electrolyzer and coupling heated cooling liquid from the liquid-cooled electrolyzer to a steam production device to enable the steam production device to produce a supply of steam from the heated cooling liquid. The method also comprises coupling the supply of steam to a steam turbine power generating system to generate electrical power.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
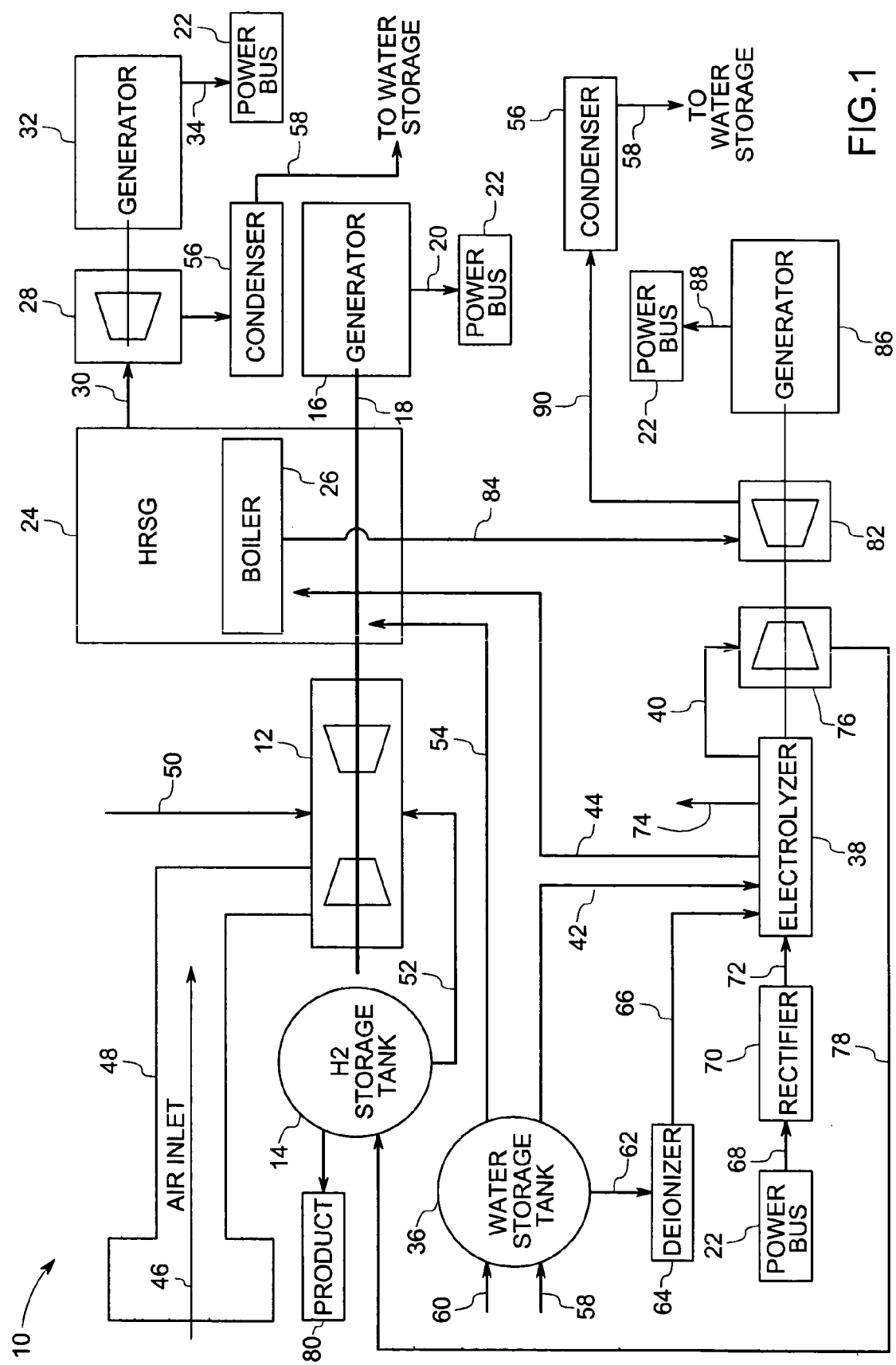
FIG. 1 is a diagrammatical representation of an exemplary power generation system, in accordance with aspects of the present technique.

Referring now to FIG. 1, a power generation system, represented generally by reference numeral 10, is illustrated. The power generation system 10 comprises a gas turbine 12, a hydrogen storage tank 14, and an electrical generator 16 operable to generate electrical power from the mechanical power produced by the gas turbine 12. It should be noted that, other types of heat engines, such as a reciprocating hydrogen engine, may be used instead of the gas turbine 12. The generator 16 is coupled to the gas turbine 12 via a shaft 18. In the illustrated embodiment, the electrical power generated by the generator 16, represented by the arrow 20, is coupled to a power bus 22 for distribution to an electrical grid.

In addition, the illustrated embodiment of the power generation system 10 comprises a heat recovery steam generator (HRSG) 24. However, other types of steam production devices may be used. The heat recovery steam generator 24 receives hot combustion products from the gas turbine 12 and uses the heat to produce steam. As will be discussed in more detail below, the steam generator 24 comprises a boiler 26 that is operable to transfer heat from the steam generator 24 to water to provide a second source of steam. A steam turbine 28 is coupled to the steam generator 24. The steam turbine 28 receives steam 30 from the steam generator 24 and uses the steam 30 to produce mechanical power to drive an electrical generator 32. Again, the electrical power generated by the generator 32, as represented by the arrow 34, is coupled to the power bus 22.

In the illustrated embodiment, the power generation system 10 also comprises a water storage tank 36 that is operable to provide a supply of water to various components of the power generation system 10. For example, the power generation system 10 also comprises a liquid-cooled electrolyzer 38 that utilizes electrolysis to produce hydrogen 40 from water. Water 42 from the water storage tank 36 may also be used for cooling the liquid-cooled electrolyzer 38. In the illustrated embodiment, the heated cooling liquid 44 from the liquid-cooled electrolyzer 38 is coupled to the steam production device 24 to enable the steam production device 24 to boil the heated cooling liquid 44 to produce steam as will be described in a greater detail below. The power generation system 10 utilizes the heat generated by the liquid-cooled electrolyzer 38 to produce steam for power generation, thereby improving the efficiency of the power generation system 10. Further, the steam production device 24 may include a separate boiler (not shown) to produce steam from additional supply of water from the water storage tank 36 to the steam production device 24.

During operation, the gas turbine 12 receives a flow of air 46 through an air inlet 48. In addition, the gas turbine 12 receives a supply both of natural gas 50 and hydrogen 52 from the hydrogen storage tank 14. Both natural gas 50 and hydrogen 52 may be used as a fuel for the operation of the gas turbine 12. The power generated by the gas turbine 12 is converted to electrical power by the electrical generator 16. Moreover, as discussed above, combustion products exhausted from the gas turbine 12 are coupled to the steam generator 24. The heat from the gas turbine exhaust is transferred to feed water 54 pumped into the steam generator 24 from the water storage tank 36 to produce steam 30. The steam 30 produced by the steam generator 24 is used to drive the steam turbine 28.

In the illustrated embodiment, the steam from the steam turbine 28 is condensed back into water by a condenser 56. The condensate produced by the condenser 56 is directed to the water storage tank 36, as represented by the arrow 58. Additionally, the water storage tank 36 may receive water from an external source 60. The water from the water storage tank 36 may be used by the different components of the power generation system 10. In one embodiment, water 62 from the water storage tank 36 is utilized by the liquid-cooled electrolyzer 38 for the production of hydrogen 40 via the electrolysis of water. The water 62 from the water storage tank 36 may be de-ionized before the water 62 is supplied to the liquid-cooled electrolyzer 38. In this embodiment, the water 62 from the water storage tank 36 is directed to a deionizer 64 before entering the liquid-cooled electrolyzer 38. The de-ionized water 66 from the deionizer 64 is then supplied to the liquid-cooled electrolyzer 38. In this embodiment, the liquid-cooled electrolyzer 38 also receives a flow of water 42 from the water storage tank 36 for cooling the liquid-cooled electrolyzer 38.

In operation, the liquid-cooled electrolyzer 38 receives electrical power from the power bus 22. The electrical power 68 from the power bus 22 is directed to a rectifier 70 that is operable to convert alternating current (AC) from the power bus 22 to direct current (DC) at a desired voltage and current for the operation of the liquid-cooled electrolyzer 38. The liquid-cooled electrolyzer 38 uses the electrical power 72 for processing the de-ionized water 66 for generation of hydrogen 40 and oxygen 74. In this embodiment, the hydrogen 40 produced by the liquid-cooled electrolyzer 38 is compressed by a hydrogen compressor 76 for storage in the hydrogen storage tank 14. Subsequently, the stored hydrogen 78 may be dispensed as a product 80. Alternatively, the stored hydrogen 78 may be utilized as a fuel for the gas turbine 12 of the power generation system 10.

The liquid-cooled electrolyzer 38 comprises an electrolyte. Examples of the electrolyte include a polymer electrolyte membrane (PEM), an alkaline, a solid oxide and polybenzimidazole (PBI). However, other types of electrolytes may also be used. The operation of the electrolyzer 38 produces heat, which is carried away from the electrolyzer 38 by the cooling water 44. In this embodiment, the heated cooling water 44 is boiled in the steam generator 24 to become steam. The energy transferred to the heated cooling water 44 by the electrolyzer 38 reduces the amount of energy that is needed to boil the heated cooling water 44 to produce steam. In this embodiment, the heated cooling water 44 from the electrolyzer 38 is directed to the boiler 26 in the steam generator 24. The steam generator 24 transfers heat to the heated cooling water 44 from the electrolyzer 38 to convert the heated cooling water 44 to steam.

In a presently contemplated configuration, the power generation system 10 comprises an additional steam turbine 82 to receive steam 84 from the boiler 26 within the steam generator 24. The boiler 26 produces steam 84 from the cooling water 44 heated by the electrolyzer 38. The steam turbine 82 is coupled to an electrical generator 86 to generate electrical power 88 that is transmitted to the power bus 22.

The steam turbine 82 is coupled to the compressor 76 to provide the motive force to enable the compressor 76 to compress the hydrogen 40 produced by the electrolyzer 38. Furthermore, steam 90 from the steam turbine 82 is condensed into condensate 58 by the condenser 56. The condensate 58 is directed to the water storage tank 36 in this embodiment.

As can be seen above, the heat produced by the liquid-cooled electrolyzer 38 is advantageously utilized by the power generation system 10 to enhance the efficiency of the power generation system 10. The electrolyzer 38 may also be used to improve the overall productivity of the power generation system 10 by providing a demand for power when electrical demand is low. For example, the power generation system 10 may be used to provide power to operate the electrolyzer 38 to produce hydrogen when electrical demand is low. The hydrogen may then be used to power the gas turbine 12, used in some other application, or sold.

Figure 2:
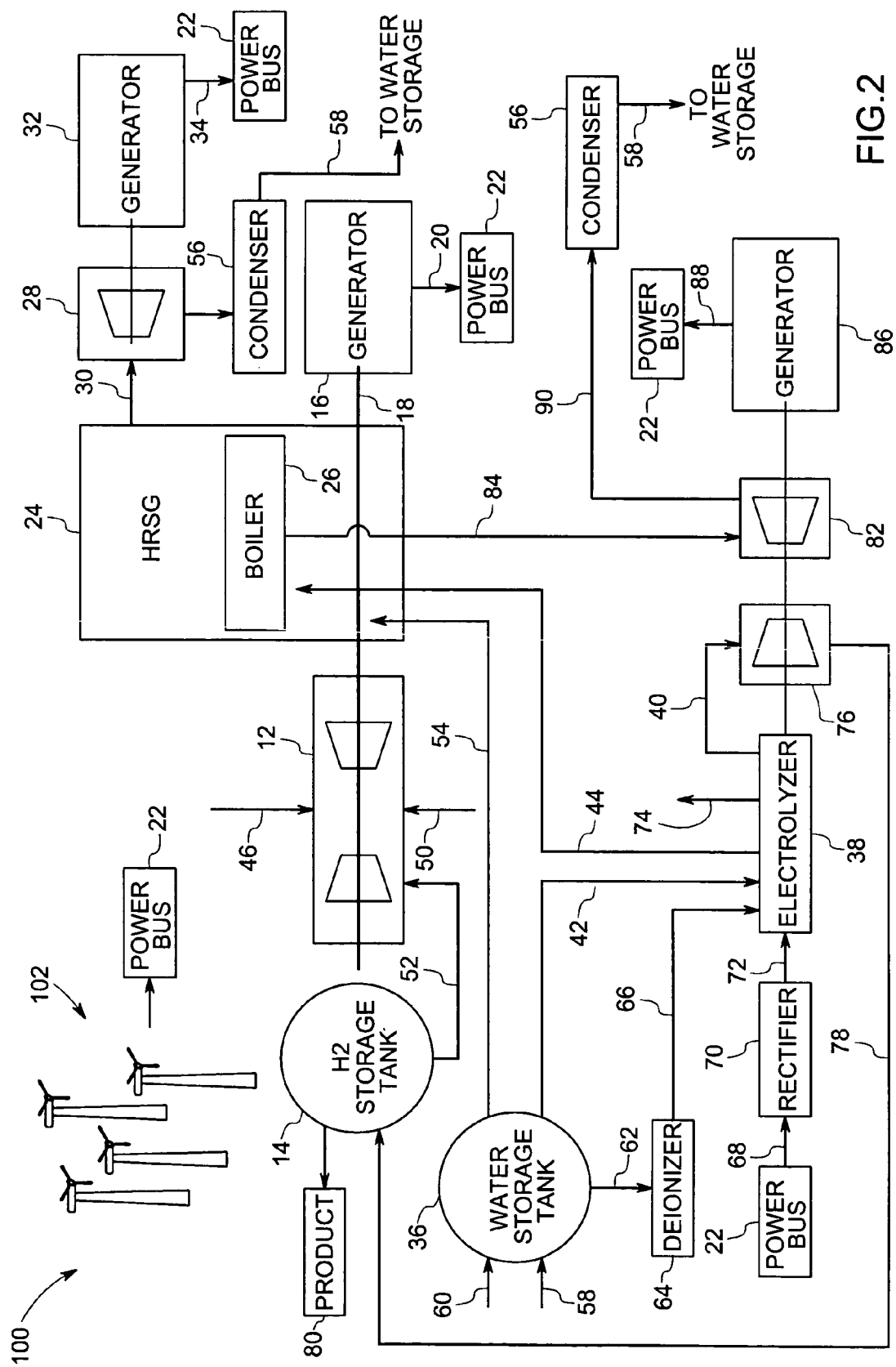
FIG. 2 is a diagrammatical representation of an exemplary power generation system with a renewable energy power source, in accordance with aspects of the present technique.

Referring generally to FIG. 2, an alternative embodiment of a power generation system 100 is provided. The illustrated power generation system 100 utilizes a renewable energy source 102 as the primary energy source. In the illustrated embodiment, the renewable energy source 102 is a wind turbine electrical generating system that is operable to supply power to the power bus 22. However, the renewable energy source 102 may be a solar power electrical generating system, or some other renewable energy source. In addition, a gas turbine 12 is provided as a back-up supply power in case the renewable energy source 102 is unable to meet electrical demand. As with the embodiment of FIG. 1, an electrolyzer 38 is provided to improve the productivity of the system 100 by producing and storing hydrogen and subsequently using the stored hydrogen for power generation when the renewable energy source 102 is unable to meet the electrical demand.

Figure 3:
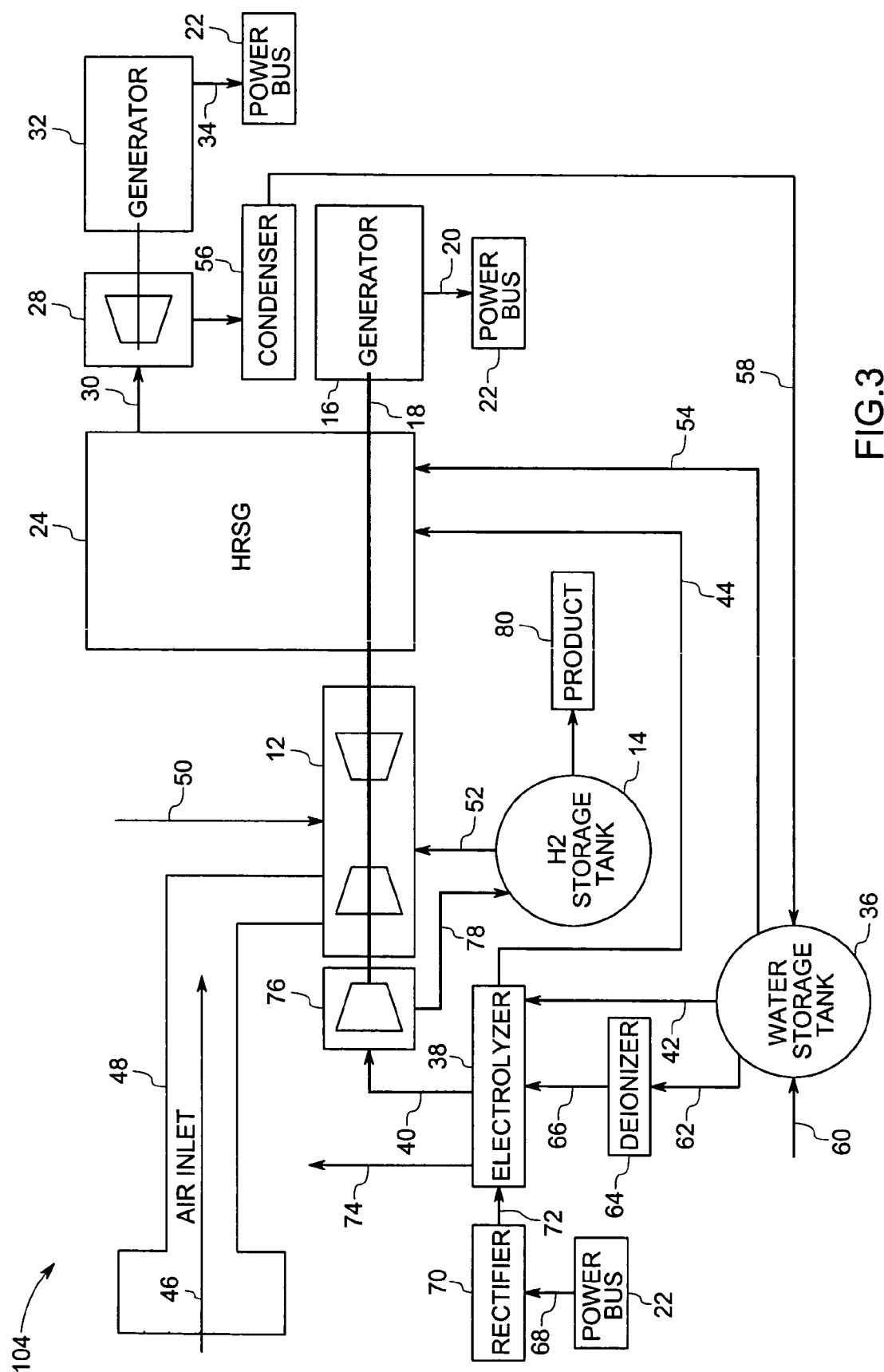
FIG. 3 is a diagrammatical representation of an exemplary power generation system with an open loop heat transfer from an electrolyzer to a steam production device, in accordance with aspects of the present technique.

Referring generally to FIG. 3, a second alternative embodiment of a power generation system 104 is provided. The illustrated embodiment is an open loop cooling system that supplies heated cooling liquid 44 from the electrolyzer 38 to the steam generator 24 for conversion to steam. In the illustrated embodiment, the gas turbine 12 receives a supply of hydrogen 52 that is produced by the liquid-cooled electrolyzer 38 from the hydrogen storage tank 14. The heat generated by the gas turbine 12 is coupled to the steam generator 24 to transform the heated cooling liquid 44 into steam 30. The gas turbine 12 drives a common shaft 18 that is coupled to the generator 16 and the hydrogen compressor 76. As noted above, in this embodiment, the heated cooling liquid 44 from the liquid-cooled electrolyzer 38 is operatively coupled to the steam generator 24 for the generation of steam. Furthermore, the steam generated by the steam generator 24 is provided to the steam turbine 28 for power generation, thereby increasing the efficiency of the power generation system 104.

Figure 4:
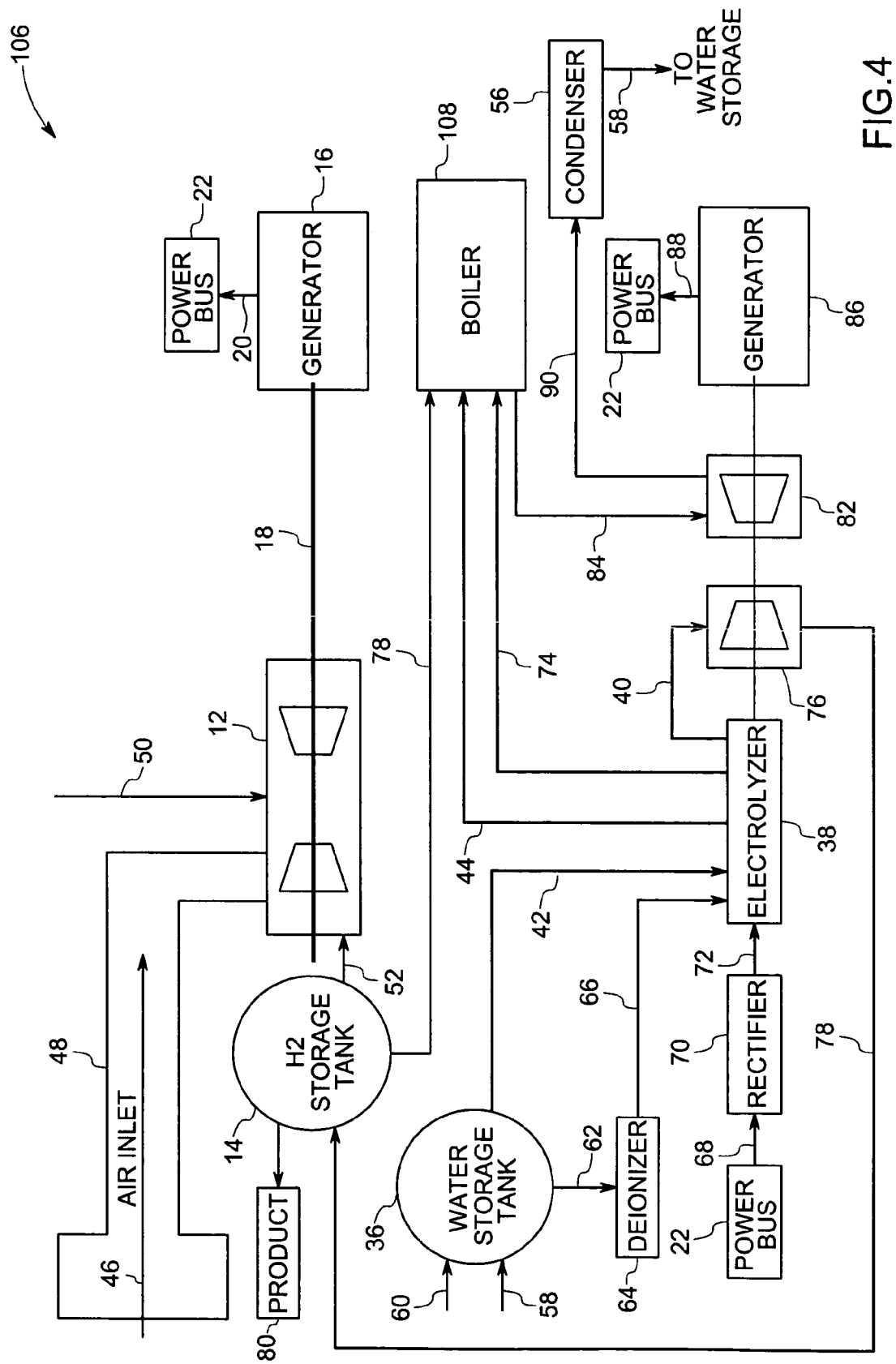
FIG. 4 is a diagrammatical representation of another exemplary power generation system with an open loop heat transfer from an electrolyzer to a heat exchanger, in accordance with aspects of the present technique.

FIG. 4 illustrates another alternative embodiment of a power generation system 106 with open loop heat transfer from an electrolyzer 38 to a boiler 108, rather than to a heat recovery steam generator. In the presently contemplated configuration, the heated cooling liquid 44 from the electrolyzer 38 is coupled to the boiler 108. The boiler 108 produces a flame that generates heat that is transferred to the heated cooling liquid 44 to boil the heated cooling liquid 44 to produce steam 84. Further, the boiler 108 utilizes hydrogen 78 and oxygen 74 generated from the electrolyzer 38 to produce the flame. The steam 84 produced by the boiler 108 is coupled to the steam turbine 82 to provide the motive force to drive the steam turbine 82. In this embodiment, the steam turbine 82 drives an electrical generator 86 and the hydrogen compressor 76.

Figure 5:
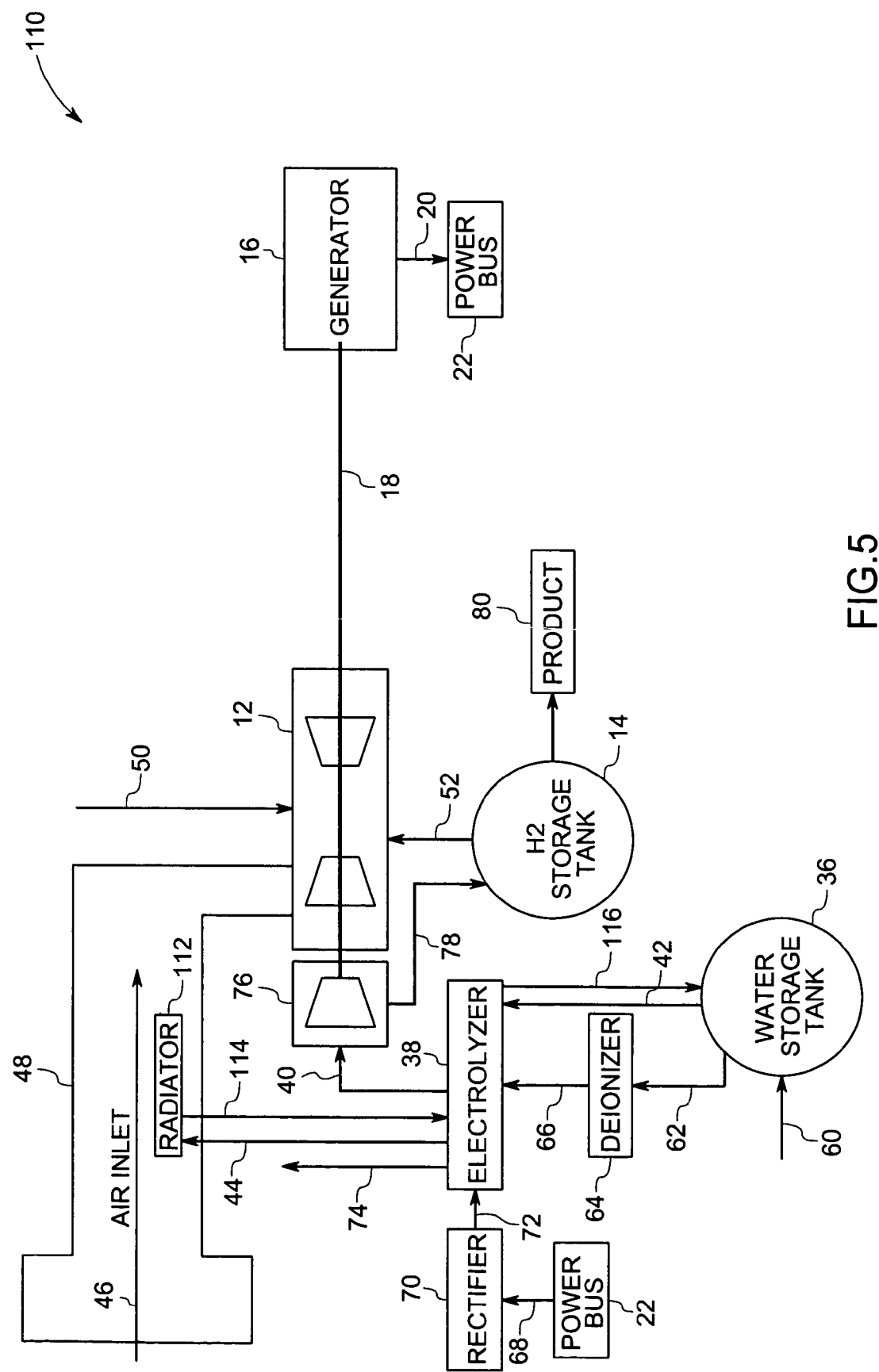
FIG. 5 is a diagrammatical representation of an exemplary power generation system employing heat transfer from an electrolyzer to preheat inlet air of a gas turbine.

Referring generally to FIG. 5, an additional alternative embodiment of a power generation system 110 is provided. In this embodiment, heat generated by the electrolyzer 38 is transferred from the electrolyzer 38 to air 46 prior to the air 46 entering the gas turbine 12. In the illustrated embodiment, the gas turbine 12 comprises a heat exchanger 112, such as a radiator, that receives heated cooling liquid 44 from the electrolyzer 38 and transfers the heat to the air 46 in the air inlet 48. However, the hydrogen 40 or oxygen 74 produced by the electrolyzer 38 may be coupled to the heat exchanger 112 to transfer their heat to the air 46 via the heat exchanger 112. Here, the water 114 from the heat exchanger 112 may be returned to the electrolyzer 36. In addition, water 116 may flow from the electrolyzer 38 or the heat exchanger 112 to the water storage tank 36.

The various aspects of the method described hereinabove have utility in power generation systems, used for different applications. As noted above, the excess power from a power generation system during off peak demand periods may be utilized for an electrolyzer for production of hydrogen. Further, the heat from the electrolyzer may be advantageously used to enhance the efficiency of the power generation system to generate additional electric power.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power generation system, comprising:
   a steam turbine;
   a steam production device operable to provide a supply of steam for the steam turbine;
   a liquid-cooled electrolyzer operable to produce a supply of hydrogen from water; and
   a cooling system operable to provide cooling liquid to the liquid-cooled electrolyzer and to couple heated cooling liquid from the liquid-cooled electrolyzer to the steam production device to enable the steam production device to produce steam from the heated cooling liquid.

2. The system of claim 1, comprising a heat engine, wherein hydrogen produced by the electrolyzer is coupled to the heat engine for use as fuel by the heat engine.

3. The system of claim 2, wherein the heat engine comprises a gas turbine.

4. The system of claim 2, wherein the steam production device is a heat recovery steam generator and the heat generated by the heat engine is coupled to the heat recovery steam generator to provide energy for producing the supply of steam for the steam turbine.

5. The system of claim 4, comprising a plurality of electrical generators, wherein a first electrical generator is mechanically coupled to the heat engine and a second electrical generator is mechanically coupled to the steam turbine.

6. The system of claim 1, wherein the steam production device comprises a boiler.

7. The system of claim 1, wherein the liquid-cooled electrolyzer comprises a polymer electrolyte membrane (PEM).

8. The system of claim 1, wherein the liquid-cooled electrolyzer comprises an alkaline electrolyte.

9. The system of claim 1, wherein the liquid-cooled electrolyzer comprises a solid oxide electrolyte.

10. The system of claim 1, wherein the liquid-cooled electrolyzer comprises a polybenzimidazole (PBI) electrolyte.

11. The system of claim 1, comprising a hydrogen compressor operable to compress hydrogen generated by the liquid-cooled electrolyzer.

12. The system of claim 1, comprising a water storage tank operable to supply water to the liquid-cooled electrolyzer for generation of hydrogen.

13. The system of claim 1, comprising a hydrogen storage tank to store hydrogen produced by the liquid-cooled electrolyzer.

14. The system of claim 1, comprising a renewable energy power generating system operable to supply power to the liquid-cooled electrolyzer for electrolysis of water.

15. The system of claim 14, wherein the renewable energy power generating system comprises a wind turbine electrical power generating system.

16. The system of claim 1, comprising a boiler, wherein heat from the boiler is transferred to the heated cooling liquid from the electrolyzer to boil the heated cooling liquid.

17. The system of claim 16, wherein the boiler utilizes hydrogen generated by the liquid cooled electrolyzer to generate heat, wherein heat is transferred to the heated cooling liquid from the electrolyzer to boil the heated cooling liquid.

18. The system of claim 16, wherein the boiler utilizes oxygen generated by the liquid cooled electrolyzer to generate heat, wherein heat is transferred to the heated cooling liquid from the electrolyzer to boil the heated cooling liquid.

19. A method of operating a power generation system comprising:
   operating a liquid-cooled electrolyzer to produce hydrogen from water;
   coupling heated cooling liquid from the liquid-cooled electrolyzer to a steam production device;
   boiling the heated cooling liquid to produce steam; and
   coupling the steam to a steam turbine power generation system to generate electrical power.

20. The method of claim 19, comprising supplying hydrogen produced by the liquid-cooled electrolyzer to a heat engine for use as a fuel by the heat engine.

21. The method of claim 19, wherein coupling heated cooling liquid from the liquid-cooled electrolyzer to a steam production device comprises coupling the heated cooling liquid to a boiler.

22. The method of claim 19, wherein coupling heated cooling liquid from the liquid-cooled electrolyzer to a steam production device comprises coupling the heated cooling liquid to a heat recovery steam generator.

23. The method of claim 19, comprising compressing hydrogen generated by the liquid-cooled electrolyzer for storage.

24. The method of claim 19, comprising de-ionizing water from a water storage tank and supplying de-ionized water to the liquid-cooled electrolyzer for producing hydrogen.

25. The method of claim 19, comprising providing power to the liquid-cooled electrolyzer for electrolysis of water via a power generating system that uses a renewable energy source to generate power.

26. A method of improving productivity of a power generating system, comprising:
   operating the power generating system to provide power to meet electrical demand during periods of peak power demand;

operating an electrolyzer to produce hydrogen during periods of non-peak power demand periods of operation of the power generating system;

using heat generated by the electrolyzer for generation of electrical power; and stopping operation of the electrolyzer during periods of peak power demand.

27. The method of claim 26, comprising storing hydrogen produced by the electrolyzer in a hydrogen storage tank.

28. The method of claim 26, comprising coupling liquid heated by the electrolyzer to a steam production device for conversion to steam.

29. The method of claim 28, comprising supplying the steam to a steam turbine for generation of power.

30. The method of claim 28, comprising coupling heat from the electrolyzer to a heat engine for heating air entering an air inlet of the heat engine.

31. The method of claim 26, wherein the power generation system comprises a generator coupled to a drive.

32. The method of claim 31, wherein the drive comprises a turbine.

33. The method of claim 31, wherein the drive comprises a steam engine.

34. The method of claim 31, wherein the drive comprises a gas engine.

35. The method of claim 31, wherein the drive comprises a wind driven system.

36. The method of claim 31, wherein the generator and the drive comprise a solar power system driven by solar energy.

37. A method of producing power from a renewable energy source, comprising:
 producing electricity using a renewable energy source;
 operating an electrolyzer to produce hydrogen from water;
 storing the hydrogen produced by the electrolyzer;
 providing the hydrogen as fuel to a heat engine coupled to a generator to enable the heat engine to drive the generator to produce power when the renewable energy source is not available; and
 using heat generated by the electrolyzer for generation of electrical power.

38. The method of claim 37, comprising cooling the electrolyzer with water.

39. The method of claim 37, comprising boiling heated cooling water from the electrolyzer to form steam to power a steam turbine.

40. The method of claim 37, comprising using the heated cooling water from the electrolyzer to heat inlet air to the heat engine.

41. The method of claim 37, comprising using heated hydrogen from the electrolyzer to heat inlet air to the heat engine.

42. The method of claim 37, comprising using heated oxygen from the electrolyzer to heat inlet air to the heat engine.

43. The method of claim 37, wherein the renewable energy source comprises a wind turbine, a solar power device, or a combination thereof.

44. A method of improving productivity of a power generating system, comprising:
 operating the power generating system to provide power to meet electrical demand during periods of peak power demand;
 operating an electrolyzer to produce hydrogen during periods of non-peak power demand periods of operation of the power generating system;
 using heat generated by the electrolyzer for generation of electrical power; and
 storing hydrogen produced by the electrolyzer in a hydrogen storage tank.

45. The method of claim 44, wherein the power generation system comprises a generator coupled to a drive.

46. The method of claim 45, wherein the drive comprises a turbine, a steam engine, a gas engine, a wind driven system, or a combination thereof.

47. The method of claim 45, wherein the generator and the drive comprise a solar power system driven by solar energy.

48. A method of improving productivity of a power generating system, comprising:
 operating the power generating system to provide power to meet electrical demand during periods of peak power demand;
 operating an electrolyzer to produce hydrogen during periods of non-peak power demand periods of operation of the power generating system;
 using heat generated by the electrolyzer for generation of electrical power; and
 coupling liquid heated by the electrolyzer to a steam production device for conversion to steam.

49. The method of claim 48, wherein the power generation system comprises a generator coupled to a drive.

50. The method of claim 49, wherein the drive comprises a turbine, a steam engine, a gas engine, a wind driven system, or a combination thereof.

51. The method of claim 49, wherein the generator and the drive comprise a solar power system driven by solar energy.

* * * * *